(12) United States Patent
Calvel et al.

(10) Patent No.: US 10,500,767 B2
(45) Date of Patent: *Dec. 10, 2019

(54) MOLDING ELEMENT FOR MANUFACTURING A NOISE REDUCING TREAD

(71) Applicant: COMPAGNIE GENERALE DES ETABLISSEMENTS MICHELIN, Clermont-Ferrand (FR)

(72) Inventors: Romain Calvel, Clermont-Ferrand (FR); Khotchakorn Pengsaloong, Tokyo (JP); Supradit Khaoyabut, Tokyo (JP)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/763,955

(22) PCT Filed: Sep. 20, 2016

(86) PCT No.: PCT/JP2016/004287
§ 371 (c)(1),
(2) Date: Mar. 28, 2018

(87) PCT Pub. No.: WO2017/056458
PCT Pub. Date: Apr. 6, 2017

(65) Prior Publication Data
US 2018/0272567 A1    Sep. 27, 2018

(30) Foreign Application Priority Data

Sep. 30, 2015  (WO) .................. PCT/JP2015/078419

(51) Int. Cl.
*B29D 30/06* (2006.01)
*B29C 33/42* (2006.01)
(Continued)

(52) U.S. Cl.
CPC .......... *B29C 33/42* (2013.01); *B29D 30/0606* (2013.01); *B29D 30/66* (2013.01);
(Continued)

(58) Field of Classification Search
CPC ........ B29D 30/0606; B29D 2030/0612; B29C 33/123; B60C 11/1369
See application file for complete search history.

(56) References Cited

U.S. PATENT DOCUMENTS 6,143,223 A * 11/2000 Merino Lopez ... B29D 30/0606
                                                             249/142
6,484,772 B1 * 11/2002 De Labareyre ........ B29D 30/52
                                                             152/209.17
(Continued)

FOREIGN PATENT DOCUMENTS

EP    0 858 875 A1    8/1998
JP    2002-331526 A   11/2002
(Continued)

OTHER PUBLICATIONS

International Search Report issued in PCT/JP2016/004287 dated Oct. 25, 2016.

*Primary Examiner* — James P Mackey
(74) *Attorney, Agent, or Firm* — Dickinson Wright PLLC

(57) ABSTRACT

The present disclosure provides for a molding element for a mold used for manufacturing a tread of a tire having a plurality of contacting element, a plurality of grooves and a connecting member connecting two side faces of adjacent contacting elements, the molding element having a molding surface and a rib for forming the groove between adjacent (Continued)

contacting elements and at least two rib side faces, the rib having a notching portion, a guiding member made of a material different from a material of the molding element being received in the notching portion and has two opposite side faces and a top face configured to form a part of a bottom of the groove, a distal end of the rib projecting member has a chamfered surface facing to an obliquely upward direction for guiding the connecting member toward the guiding slit.

4 Claims, 5 Drawing Sheets

(51) Int. Cl.
*B60C 11/03* (2006.01)
*B60C 11/04* (2006.01)
*B29D 30/66* (2006.01)
*B29C 33/12* (2006.01)

(52) U.S. Cl.
CPC ........ *B60C 11/0309* (2013.01); *B60C 11/047* (2013.01); *B29C 33/123* (2013.01); *B29D 2030/0607* (2013.01); *B29D 2030/0612* (2013.01); *B29D 2030/665* (2013.01)

(56) References Cited

U.S. PATENT DOCUMENTS

| | | |
|---|---|---|
| 9,688,039 B2 | 6/2017 | Pialot, Jr. |
| 2008/0152744 A1 | 6/2008 | Nguyen et al. |
| 2010/0186861 A1* | 7/2010 | Ishiguro .............. B60C 11/0306 152/209.25 |
| 2018/0001715 A1 | 1/2018 | Tezuka |

FOREIGN PATENT DOCUMENTS

| | | |
|---|---|---|
| JP | 2010-253694 A | 11/2010 |
| KR | 20130078562 A | 7/2013 |
| WO | 2013/178473 A1 | 12/2013 |
| WO | 2016/104662 A1 | 6/2016 |

* cited by examiner

MOLDING ELEMENT FOR MANUFACTURING A NOISE REDUCING TREAD

CROSS-REFERENCE TO RELATED APPLICATIONS

This application is a 371 national phase entry of PCT/JP2016/004287, filed 20 Sep. 2016, which claims the benefit of International Patent Application No. PCT/JP2015/078419, filed 30 Sep. 2015.

BACKGROUND

In recent years, premiumisation and quality improvement of vehicles leads, from the view point of occupant's comfort and environmental considerations, desire to various noise reductions, in particular pass-by noise.

When a contacting element on a tread of a tire enters to or exits from a contact patch during rolling, the tread is forced to be bent due to flattening. At this stage, geometrical discontinuity caused by periodical contact of relatively axial grooves to the contact patch leads inhomogeneity of a bending stiffness of the tread in a circumferential direction and excites internal construction of the tire to generate noise.

In order to reduce such inhomogeneity of the bending stiffness of the tread in a circumferential direction, it is known that reduction of a volume of the axial groove is effective. However, it is also known that reduction of the volume of the axial groove penalizes hydroplaning performance of the tread. Thus, it is desired to improve noise performance while maintaining hydroplaning performance.

The applicants have proposed in FIG. 1 of an international patent application PCT/JP2015/086150, a pneumatic tire tread having a connecting member connecting a transverse face of a contacting element to a transverse face of a circumferentially adjacent contacting element and being made of a material having a higher Young modulus than a Young modulus of a contacting element to obtain satisfactory hydroplaning performance and satisfactory noise performance at the same time. In FIG. 6, is disclosed a pneumatic tire tread having a connecting member connecting a transverse face of a contacting element to a transverse face of circumferentially adjacent contacting element and extending continuously through two transverse faces of the same contacting element for improving productivity of such tread.

However, embedding such connecting member in the contacting element so as to connect two side faces of adjacent contacting elements across the groove requires complicated manufacturing process, thus improvement of productivity of such tread is still insufficient.

EP0858875A1 discloses, in FIG. 1, a mold having a first die and a second die functionally adapted to form at least one orifice allowing a rubber passing through the orifice during molding. However with such configuration, it is difficult to remove the first die or the second die which forms a bottom of a groove or an incision in particular in a form of a tire, thus a complicated process for removing such die is still required.

KR20130078562A discloses, in FIGS. 3 to 5, a method and a mold for manufacturing a pneumatic tire having a reinforced cord crossing a groove using a reinforced cord insertion block installed in a mold. However with such configuration, it is difficult to give a movement to the reinforced cord insertion block, necessary to place the reinforced cord into the reinforced cord insertion block thus a complicated process is still required, and moreover difficult to prevent rubber from flashing into the groove.

US20080152744A1 discloses, in FIG. 1, a molding element suitable for molding sunken grooves or sipes in a tread, and such device may be comprised of a thin flexible wire. However, with such molding element it is difficult to place a connecting member as to connect side faces of different contacting elements as the thin flexible wire is pulled out from the tread.

A "tire" means all types of elastic tire whether or not subjected to an internal pressure.

A "green tire" means a superposition of a plurality of semi-finished rubber products present in the form of strips or sheets, with or without reinforcement. The green tire is intended to be vulcanized in a mold in order to obtain the tire.

A "tread" of a tire means a quantity of rubber material bounded by lateral surfaces and by two main surfaces one of which is intended to come into contact with ground when the tire is rolling.

A "mold" means a collection of separate molding elements which, when brought closer towards one another, delimit a toroidal molding space.

A "molding element" of a mold means part of a mold. A molding element is, for example, a mold segment.

A "molding surface" of a molding element means a surface of the mold that is intended to mold a surface of the tread.

A "modulus at 10% elongation" is a tensile stress (in MPa) at ten percent (10%) elongation measured according to ASTM standard D412.

A "groove" is a space between two rubber faces/sidewalls which do not contact between themselves under usual rolling condition connected by another rubber face/bottom. A groove has a width and a depth.

It is thus an object of the disclosure to provide a molding element for a mold used for manufacturing a tread of a tire, such molding element can improve productivity for manufacturing a tread provided with a connecting member connecting two side faces of adjacent contacting elements.

SUMMARY

The present disclosure provide a plurality of contacting element delimited by a plurality of grooves and a connecting member connecting two side faces of adjacent contacting elements, the molding element having a molding surface for forming a contact face of the contacting elements intended to come into contact with ground during rolling and a rib for forming the groove between adjacent contacting elements, at least two rib side faces forming the side faces of the contacting element, the rib having a notching portion, a guiding member made of a material different from a material of the molding element being received in the notching portion and has two opposite side faces configured to form a part of the side faces of the contacting element and a top face configured to form a part of a bottom of the groove, said material of the guiding member having a modulus at 10% elongation lower than that of the molding element, the guiding member having a guiding slit extending from one of the two opposite side faces to the other of the two opposite side faces through the guiding member and radially from the top face, the top face of the guiding member being partly covered by a pair of rib projecting members projecting from opposed side faces of the notching portion, and a rib projection opening portion being formed between the pair of rib projecting members, a distal end of the rib projecting member has a chamfered surface facing to an obliquely upward direction for guiding the connecting member toward the guiding slit.

This arrangement improves productivity for manufacturing a tread provided with a connecting member connecting two side faces of adjacent contacting elements.

Since the guiding slit extends from one of the opposite two side faces to the other of the opposite two side faces through the guiding member, the guiding slit can receive the connecting member to be positioned at a predetermined position during molding, and release the connecting member from the mold during demolding without any complicated process. As a result, productivity for manufacturing the tread provided with the connecting member can be improved.

Since the material constituting the guiding member has lower modulus at 10% elongation than that of the molding element, it is possible to let the connecting member enter to/exit from the guiding slit. Once the connecting member has passed, the guiding slit is substantially closed for preventing rubber from flashing into the guiding slit during molding which can prevent rubber from flashing in the groove after demolding.

Since the guiding member made of the material different from the material constituting the molding element is received in the notching portion, it is possible to maintain a form of the side faces of the contacting element. As a result hydroplaning performance can be maintained. At the same time, since the guiding member which exposed to stresses from the connecting member is constructed as a separate and replaceable member in the molding element, maintenance of the molding element can be easier.

Since the top face of the guiding member is partly covered by a pair of rib projecting members projecting inwardly from opposed side faces of the notching portion and the guiding slit is exposed through a rib projection opening portion formed between the pair of rib projecting members, the pair of rib projecting members is able to reliably prevent the guiding member from slipping out from the rib during demolding while securing the connecting member entering to/exiting from the guiding slit. As a result, productivity for manufacturing the tread provided with the connecting member can effectively be improved.

Since a distal end of the rib projecting member has a chamfered surface facing to an obliquely upward direction for guiding the connecting member toward the guiding slit, the connecting member can securely be guided toward the guiding slit during molding even if the connecting member is not appropriately aligned with the guiding slit. As a result, productivity for manufacturing the tread provided with the connecting member can more effectively be improved.

In another preferred embodiment, the rib projection opening portion is devoid of the guiding member.

According to this arrangement, since the shape of the guiding member can be maintained as a simple shape, better productivity and maintenance of the guiding member can be achieved.

In another preferred embodiment, a width Wo of the rib projection opening portion (that is the distance between the tips end of the opposite chamfered surfaces) is larger than the diameter DC of the connecting member.

According to this arrangement, the connecting member can enter into the guiding slit through the rib projection opening portion, thus productivity for manufacturing the tread having the connecting member can effectively be improved.

The width Wo of the rib projection opening portion is preferably at least 0.2 mm wider than the diameter DC of the connecting member, more preferably at least 0.3 mm wider than the diameter DC of the connecting member and at most 0.6 mm wider than the diameter DC of the connecting member.

In another preferred embodiment, an angle AC of the chamfered surface relative to a direction along which the rib projection opening portion extends, is greater than or equal to 20 degrees and less than or equal to 60 degrees.

If the above angle AC of the chamfered surface is less than 20 degrees, the connecting member may not be guided correctly via the chamfered portion due to too low angle of the chamfered portion causing difficulty in letting the connecting member enter to the guiding slit resulting degradation in productivity. If the angle AC is greater than 60 degrees, an acceptable tolerance of misalignment between the connecting member and the guiding slit may become too severe resulting degradation in productivity either. By setting the angle AC greater than or equal to 20 degrees and less than or equal to 60 degrees, productivity for manufacturing the tread having the connecting member can effectively be improved.

The angle AC is preferably greater than or equal to 25 degrees and less than or equal to 50 degrees, more preferably greater than or equal to 30 degrees and less than or equal to 45 degrees.

BRIEF DESCRIPTION OF THE DRAWINGS

Other characteristics and advantages of the disclosure arise from the description made hereafter in reference to the annexed drawings which show, as nonrestrictive examples, the embodiments of the disclosure.

DETAILED DESCRIPTION

Figure 1:
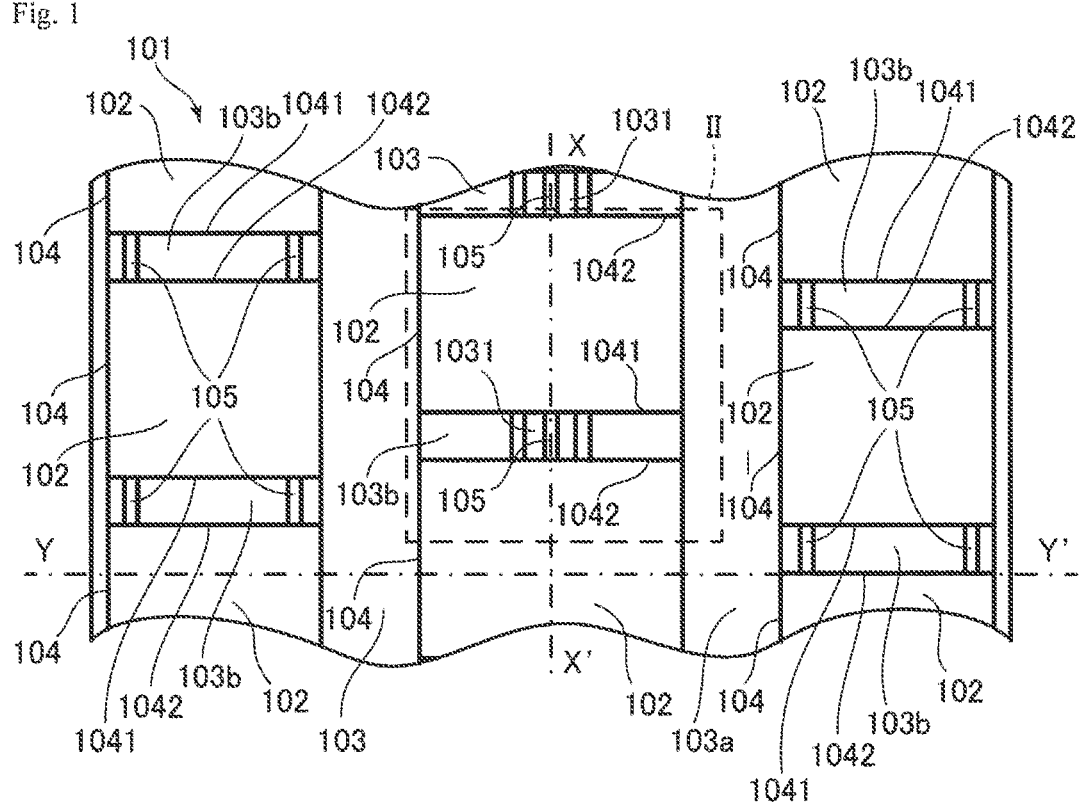
FIG. 1 is a schematic plan view of a tread for a tire molded with a mold comprising a molding element according to first embodiment of the present disclosure.

Preferred embodiment of the present disclosure will be described below referring to the drawings.

A molding element 1 for a mold used for manufacturing a tread 101 of a tire, a mold comprising the molding element 1, and a tread 101 molded and vulcanized using the mold according to an embodiment of the present disclosure will be described referring to FIGS. 1 to 6.

Figure 2:
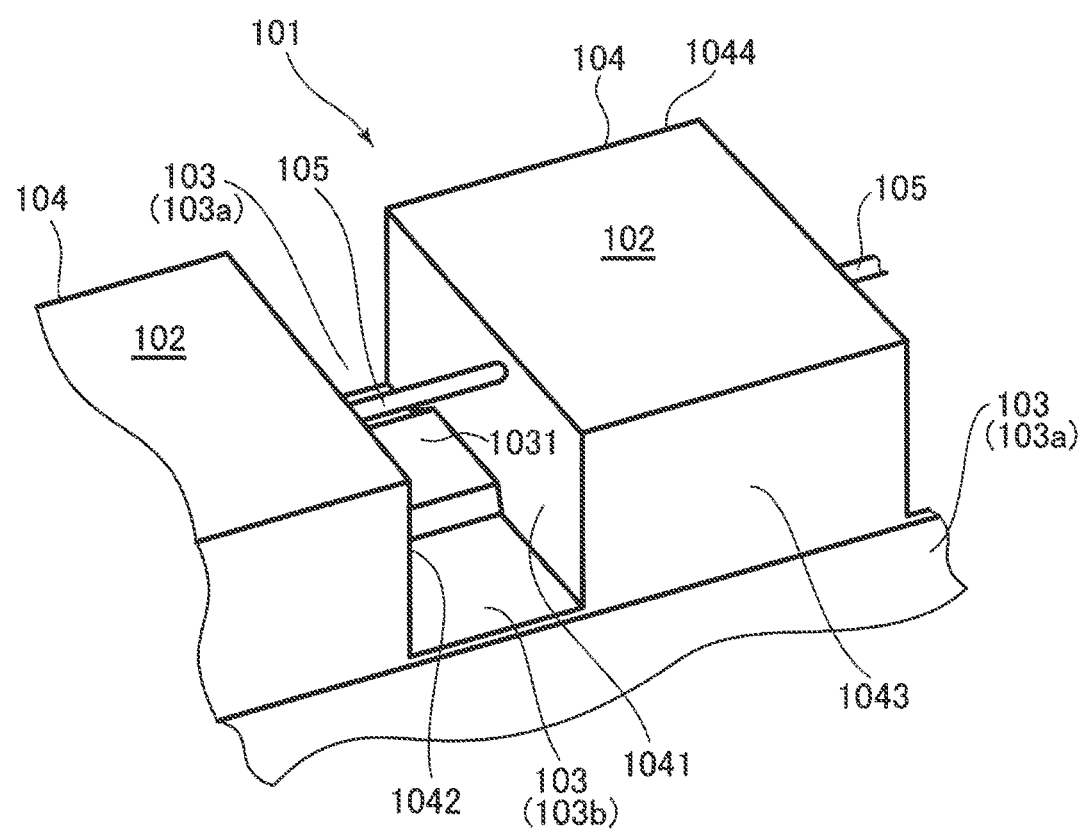
FIG. 2 is an enlarged schematic perspective view showing a portion indicated as II in FIG. 1.
Figure 3:
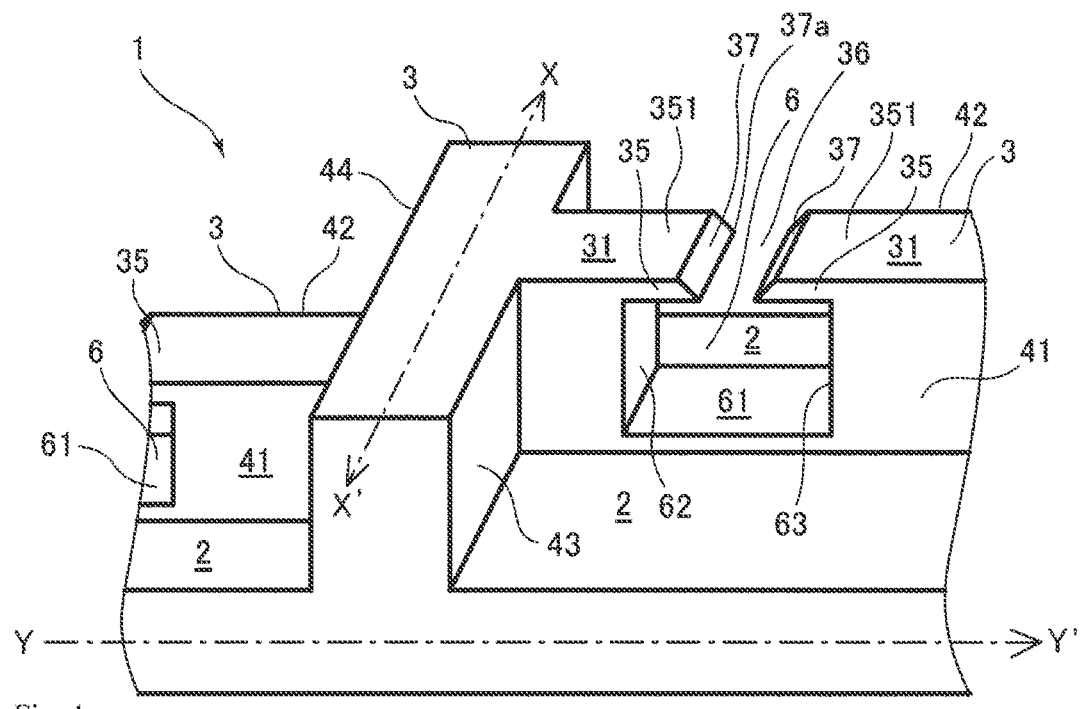
FIG. 3 is a schematic perspective view of a portion of the molding element according to first embodiment of the present disclosure.
Figure 4:
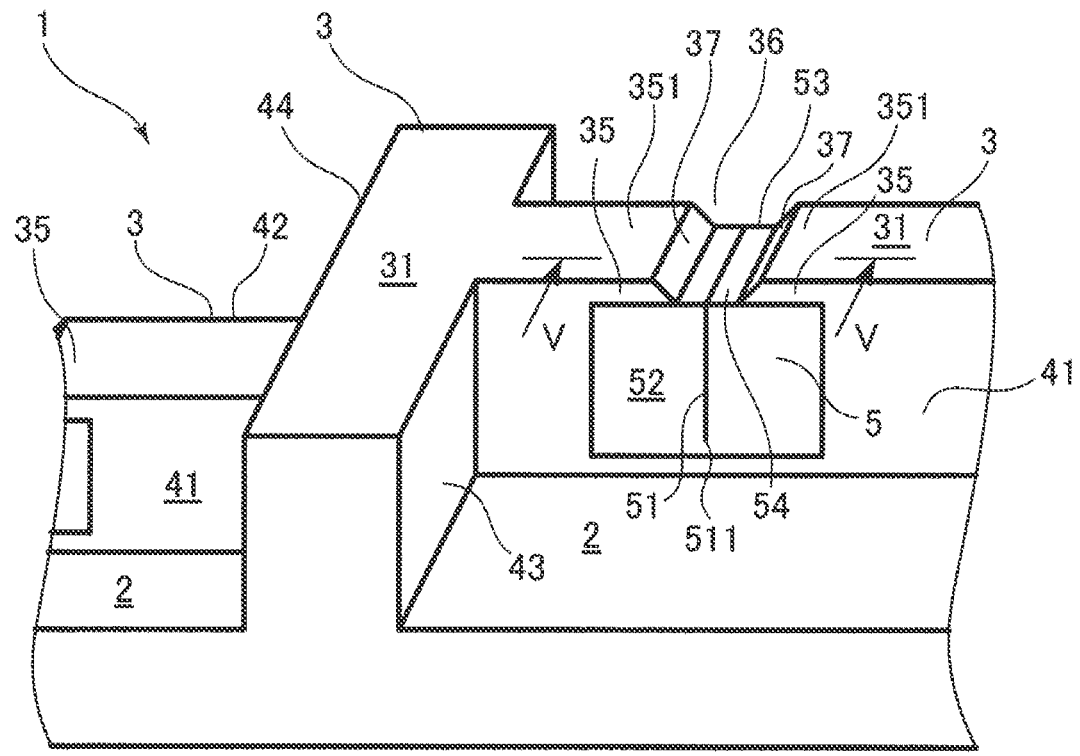
FIG. 4 is a schematic perspective view of a portion of the molding element with a guiding member according to first embodiment of the present disclosure.
Figure 5:
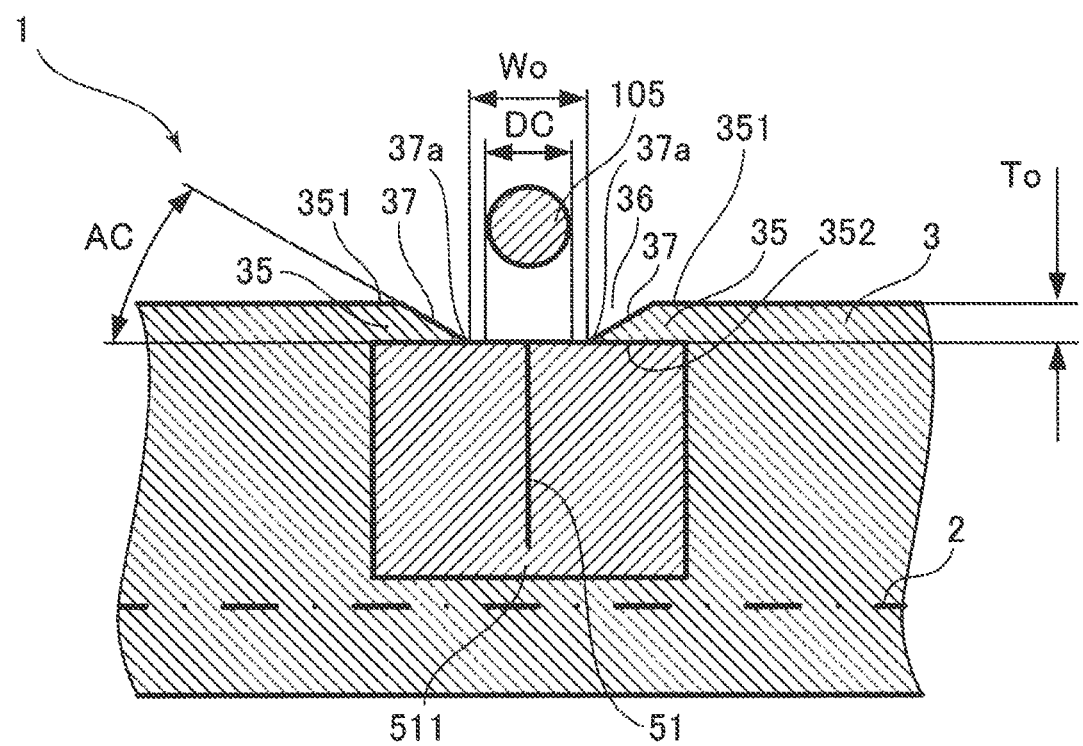
FIG. 5 is a cross sectional view taken along line V-V in FIG. 4.
Figure 6:
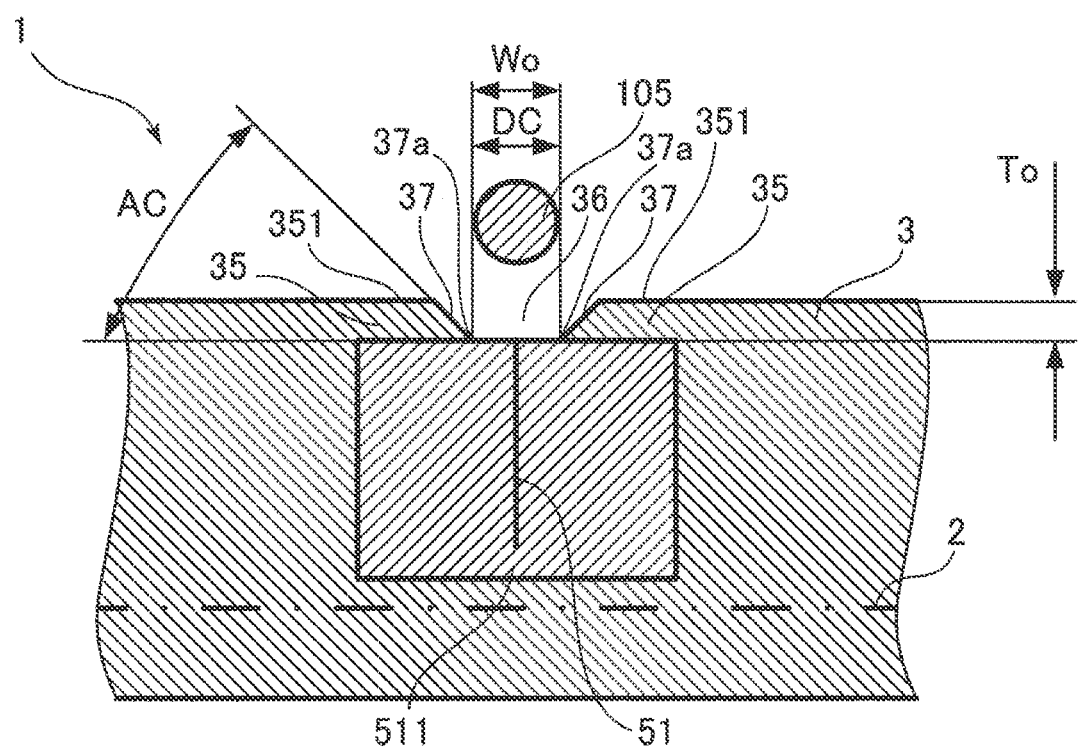
FIG. 6 is a schematic cross sectional view of a molding element according to alternative embodiment of the present disclosure.

FIG. 1 is a schematic plan view of a tread for a tire molded with a mold comprising a molding element according to a first embodiment of the present disclosure. FIG. 2 is an enlarged schematic perspective view showing a portion indicated as II in FIG. 1. FIG. 3 is a schematic perspective view of a portion of the molding element according to the first embodiment of the present disclosure. FIG. 4 is a schematic perspective view of a portion of the molding element with a guiding member according to the first embodiment of the present disclosure. FIG. 5 is a cross sectional view taken along line V-V in FIG. 4. FIG. 6 is a schematic cross sectional view of a molding element according to alternative embodiment of the present disclosure.

The tread 101 is a tread for a tire having dimension 205/55R16 and comprises a plurality of circumferential grooves 103a extending in a tire circumferential direction indicated as XX' and axial grooves 103b extending in a generally tire axial direction indicated as YY'.

As shown in FIG. 1, a plurality of contacting elements 104 having generally rectangular parallelepiped shape is formed in the tread 101. The contacting element 104 is delimited by the circumferential grooves 103a in a circumferential direction and is delimited by axial grooves 103b in an axial direction. Thus, the contacting element 104 has two transverse faces (frontal faces) 1041, 1042 facing to circumferentially opposite directions.

Adjacently arranged contacting elements 104 in a circumferential direction are separated by the axial groove 103b. The contacting element 104 has a contact face 102 intended to come into contact with ground during rolling at a top portion thereof.

The tread 101 has the same structure as the conventional tread except for an arrangement regarding the connecting member 105 and is intended to be applied to a conventional pneumatic radial tire. Thus, description of the internal construction of the tread 101 will be omitted.

Between two circumferentially adjacent contacting elements 104, a connecting member 105 having a thin rod-like shape is provided. The connecting member 105 extends across the axial groove 103b between two circumferentially adjacent contacting elements 104, as shown in FIGS. 1 and 2.

In the present embodiment, one connecting member 105 is provided between circumferentially adjacent contacting elements 104 in axially central region in the tread 101. That is, in an axially central area, circumferentially adjacent contacting elements 104 are connected by one connecting member 105. On the other hand, two connecting members 105 are provided between circumferentially adjacent contacting elements 104 in axially outward regions in the tread 101. That is, in axially outward areas, circumferentially adjacent contacting elements 104 are connected by two connecting members 105. Two connecting members 105 are positioned at the same radial position.

In the present embodiment, the connecting members 105 are arranged so as to extend substantially along the circumferential direction maintaining the same distance from the rotation axis of the tire. That is, the connecting members 105 extend in parallel to the contact face 102.

Each connecting member 105 extends along the circumferential groove 103a, thus an angle of an extending direction of the connecting member 105 relative to the tire circumferential direction is 0 degree.

In the axially central area of the tread 101, a rectangular protrusion 1031 is integrally formed on a bottom of the axial groove 103b, as shown in FIGS. 1 and 2. Specifically, the rectangular protrusion 1031 extends from one transverse face (frontal face) 1041, 1042 to the other transverse face (frontal face) 1042, 1041 and has a trapezoid cross section in the axial direction.

In the arrangement of the first embodiment, inhomogeneity of the bending stiffness of the tread 101 in circumferential direction can be drastically decreased, which results less excitation of internal construction of the tire. Thus, noise generated during rolling of the tire can be reduced.

Next, a molding element 1 for a mold used for manufacturing the tread 101 will be described referring to FIGS. 3, 4 and 5.

As shown in FIG. 3, the molding element 1 has a molding surface 2 intended to mold the contact face 102 of the contacting element 104. The molding element 1 also has a plurality of ribs 3 intended to mold the groove 103a, 103b so as to radially outwardly extend from the molding surface 2.

The rib 3 includes a rib top face 31 intended to mold a bottom of the groove 103a, 103b. A radial position of the rib top face 31 can be the same among the ribs 3, or can be different among the ribs 3.

The rib 3 intended to mold the axial groove 103b also includes circumferentially opposing rib side faces 41, 42 intended to mold the frontal faces 1041, 1042 of the contacting element 104.

The rib 3 intended to mold the axial groove 103b includes a notching portion 6. The notching portion 6 is formed by removing a part of the rib 3 and has generally rectangular parallelepiped shape defined by a bottom face 61 and axially opposing side faces 62, 63.

From a radially outermost position of the axially opposing side faces 62, 63, a pair of rib projecting members 35 projecting inwardly of the notching portion 6 as shown in FIGS. 3, 4 and 5. A top face 351 of the rib projecting member 35 is flush with the rib top face 31. Circumferential faces of the rib projecting member 35 are flush with the rib side faces 41, 42.

A distal end of the each rib projecting member 35 has a chamfered surface 37 facing to an obliquely upward direction. Between the chamfered surfaces 37, 37 of each rib projecting members 35, a rib projection opening portion 36 is defined.

The notching portion 6 receives therein a guiding member 5 having a rectangular parallelepiped shape and with a top face 54 and circumferentially opposed two side faces 52, 53.

An internal space of the notching portion 6 below the rib projecting member 35 is filled with the guiding member 5 such that the side faces 52, 53 are flush with the rib side faces 41, 42 of the rib 3, respectively, as shown in FIG. 4. The top face 54 of the guiding member 5 is partially in contact with a lower face 352 of the rib projecting member 35. Thus, the rib projection opening portion 36 is devoid of the guiding member 5 and is intended to mold the rectangular protrusion 1031.

Thus, the side faces 52, 53 of the guiding member 5 are to form a part of the frontal side faces 1041, 1042 of the contacting element 104.

As described above, the top face 54 of the guiding member 5 is partially covered by the pair of rib projecting members 35. An axially central part of the top face 54 is exposed through a rib projection opening portion 36 defined between the distal end of rib projecting member 35.

The pair of rib projecting members 35 has a thickness (radial length) To which is larger than or equal to 0.5 mm, and the rib projection opening portion 36 has a width Wo which is larger than or equal to 0.5 mm wider than a diameter DC of the connecting member 105. The thickness To corresponds to the radial height of the rectangular protrusion 1031.

The material constituting the guiding member 5 has a modulus at 10% elongation lower than that of the molding element. The material of the guiding member 5 is preferably an elastomeric composition. An example of the elastomeric composition is, for example saturated or unsaturated rubbers and thermoplastic elastomers.

The guiding member 5 has a guiding slit 51 extending circumferentially through the guiding member 5 and radially inwardly from the top face 54. That is, the guiding slit 51 extends from one of the opposite two side faces 52, 53 to the other of the opposite two side faces 52, 53 through the guiding member 5 and is circumferentially open to the side faces 52, 53 and is radially open to the top face 54 of the guiding member 5. The guiding slit 51 is provided at the central exposed part of the top face 54 exposed through a rib projection opening portion 36.

As shown in FIG. 5, a radially outward end of the guiding slit 51 opens at an axially central position on the top face 54 of the guiding member 5. A radially inward end of the guiding slit 51 terminates at a closed end 511 near the bottom face 61 of the notching portion 6.

Although the guiding slit 51 extends radially in the present embodiment, the guiding slit may extend with an angle relative to radial orientation for better demolding of the connecting member 105 for example in a region where an orientation perpendicular to the molding surface 2 differs from radial orientation of the molding element 1. The guiding slit 51 may extend along slightly curved path in radial orientation and/or in circumferential orientation.

A distance Wo between the tip ends 37a of the chamfered surfaces 37 of the pair of the rib projecting members 35 is larger (wider) than a diameter DC of the connecting member 105. The width Wo is preferably at least 0.2 mm wider than the diameter DC of the connecting member 105, more preferably at least 0.3 mm wider than the diameter DC of the connecting member 105 and at most 0.6 mm wider than the diameter DC of the connecting member 105.

The angle AC of the chamfered surface 37 relative to a direction along which the rib projection opening portion 36 extends or a direction the top face 351 of the rib projecting member 35 extends is greater than or equal to 20 degrees and less than or equal to 60 degrees.

Since the guiding slit 51 extends from one of the opposite two side faces 52, 53 to the other of the opposite two side faces 53, 52 through the guiding member 5, the guiding slit 51 can receive the connecting member 105 to be positioned at a predetermined position during molding, and release the connecting member 105 from the mold during demolding without any complicated process. As a result, productivity for manufacturing the tread provided with the connecting member can be improved.

Since the material constituting the guiding member 5 has lower modulus at 10% elongation than that of the molding element 1, it is possible to let the connecting member 105 enter to/exit from the guiding slit 51. Once the connecting member 105 has passed, the guiding slit 51 is substantially closed for preventing rubber from flashing into the guiding slit 51 during molding which can prevent rubber from flashing in the groove after demolding.

Since the guiding member 5 made of the material different from the material constituting the molding element 1 is received in the notching portion 6, it is possible to maintain a form of the side faces of the contacting element 104. As a result hydroplaning performance can be maintained. At the same time, since the guiding member 5 which is exposed to stresses from the connecting member 105 is constructed as a separate and replaceable member in the molding element 1, maintenance of the molding element can be easier.

Since the top face 54 of the guiding member 5 is partly covered by a pair of rib projecting members 35 projecting inwardly from opposed side faces 62, 63 of the notching portion 6 and the guiding slit 51 is exposed through a rib projection opening portion 36 formed between the pair of rib projecting members 35, the pair of rib projecting members 35 is able to reliably prevent the guiding member 5 from slipping out from the rib 3 during demolding while securing the connecting member 105 entering to/exiting from the guiding slit 51. As a result, productivity for manufacturing the tread 101 provided with the connecting member 105 can effectively be improved.

Since a distal end of the rib projecting member 35 has a chamfered surface 37 facing to an obliquely upward direction for guiding the connecting member 105 toward the guiding slit 51, the connecting member 105 can securely be guided toward the guiding slit 51 during molding even if the connecting member 105 is not appropriately aligned with the guiding slit 51. As a result, productivity for manufacturing the tread 101 provided with the connecting member 105 can more effectively be improved.

Since the rib projection opening portion 36 is devoid of the guiding member 5, the shape of the guiding member 5 can be maintained as a simple shape, better productivity and maintenance of the guiding member 5 can be achieved.

Since the width Wo of the rib projection opening portion 36 (that is the distance between the tips end of the opposite chamfered surfaces) is larger than the diameter DC of the connecting member 105, the connecting member 105 can enter into the guiding slit 51 through the rib projection opening portion 36, thus productivity for manufacturing the tread 101 having the connecting member 105 can effectively be improved.

The width Wo of the rib projection opening portion 36 is preferably at least 0.2 mm wider than the diameter DC of the connecting member 105, more preferably at least 0.3 mm wider than the diameter DC of the connecting member 105 and at most 0.6 mm wider than the diameter DC of the connecting member 105.

Since the angle AC of the chamfered surface 37 relative to a direction along which the rib projection opening portion 36 extends, is greater than or equal to 20 degrees and less than or equal to 60 degrees, the connecting member 105 will correctly be guided to the guiding slit 51 thanks to the chamfered surface 37, productivity for manufacturing the tread 101 having the connecting member 105 can effectively be improved. The angle AC is preferably greater than or equal to 25 degrees and less than or equal to 50 degrees, more preferably greater than or equal to 30 degrees and less than or equal to 45 degrees.

Although the chamfered surface 37 of the pair of rib projecting members 35 is symmetry in the present embodiment, the chamfered surface 37 may have different (asymmetry) shape and/or dimension in the pair of rib projecting members 35.

Although the pair of rib projecting members 35 is symmetry in the present embodiment, the pair of rib projecting members 35 may have different (asymmetry) shape and/or dimension each other.

A manufacturing of a tread 101 of a tire using a molding element of the first embodiment will be described.

As a first step, at least one connecting member 105 having diameter DC is circumferentially disposed on a surface of an unvulcanized green tire. The unvulcanized green tire with the connecting member 105 is placed in a mold having at least one molding element 1 described above.

The connecting member 105 is an elongated member such as cable, wire or strings. The connecting member 105 may be put on the surface of unvulcanized green tire, partly or completely, manually or automatically using a process similar to put semi-finished material circumferentially. The connecting member 105 may be sticked onto the surface of unvulcanized green tire with a help of, for example an adhesive or another unvulcanized rubber.

Then, as the unvulcanized green tire is moved toward the mold element 1, the connecting member 105 on the surface of the unvulcanized green tire is in contact with an upper end of the guiding slit 51 and then, forcibly opens the upper end of the guiding slit 51.

Then, the connecting member 105 is continuously pushed downwardly by portions of the green tire located in circumferentially both sides of the rib 3 and penetrated into and moved downwardly toward the closed end 511 along the guiding slit 51 deforming the guiding member 5 outwardly in a width direction. Once the connecting member 105 has passed, the guiding slit 51 is closed again.

Once the connecting member 105 reaches the closed end 511 of the guiding slit 51, the connecting member 105 cannot be further moved and stop at the closed end 511. On the other hand, the portions of the green tire located in circumferentially both sides of the rib 3 further continuously downwardly moves toward the molding surface 2 of the molding element 1. Since the guiding slit 51 is closed behind the connecting member 105, the rubber does not enter into the guiding slit 51.

Once the portions of the green tire located in circumferentially both sides of the rib 3 reaches the molding surface 2 of the molding element 1, the portions of the green tire stop moving and the mold is closed.

Then heat and pressure is applied for vulcanizing and molding the green tire. During this process, the green tire is turned to the tread 101 of the tire, to which tread 101 the connecting member 105 is fixedly attached so as to connect two frontal faces 1041, 1042 of the adjacent contacting elements 104. Specifically, a part of the connecting member 105 is exposed in the axial groove 103*b* and remaining part of the connecting member 105 is embedded in the contacting elements 104.

After completion of vulcanization and molding, the mold is opened. During demolding, the part of the connecting member 105 exposed in the axial groove 103*b* is escaped from the guiding member 5 passing through the guiding slit 51.

In the above embodiment, a width Wo of the rib projection opening portion 36 (that is the distance between the tips end of the chamfered surfaces) is larger than the diameter DC of the connecting member 105 for securely passing the connecting member 105 through the rib opening portion 36 without any damage due to such tight width Wo relative to the diameter DC of the connecting member 105. However, the width Wo may be the same as the diameter of the DC of the connecting member 105 as shown in FIG. 6.

The notching portion 6 is filled with the guiding member 5 may be made of a liquid elastomeric composition which will have necessary characteristics described above after certain period of duration after being filled into the notching portion 6.

The disclosure is not limited to the examples described and represented and various modifications can be made there without leaving its framework.

The invention claimed is:

1. A mold employed for manufacturing a tread of a tire having a plurality of contacting elements delimited by a plurality of grooves and a connecting member connecting two side faces of adjacent contacting elements of the plurality of contacting elements, comprising:

a molding element having a molding surface for forming a contact face of one of the plurality of contacting elements, the molding element also having a rib for forming the groove between adjacent contacting elements, the rib having at least two rib side faces for forming the two side faces of the adjacent contacting elements, the rib having a notching portion, a guiding member made of a material different from a material of the molding element and being received in the notching portion and having two opposite side faces shaped to form a part of the side faces of the adjacent contacting elements, the guiding member having a top face shaped to form a part of a bottom of the groove, said material of the guiding member having a modulus at 10% elongation lower than that of the molding element, the guiding member having a guiding slit extending from one of the two opposite side faces to the other of the two opposite side faces through the guiding member and radially from the top face of the guiding member, the top face of the guiding member being partly covered by a pair of rib projecting members projecting from opposed side faces of the notching portion of the rib, and the rib having a rib projection opening portion that is formed between the pair of rib projecting members, and wherein an end of each of the rib projecting members has a chamfered surface facing to an obliquely upward direction for guiding the connecting member toward the guiding slit.

2. The mold according to claim 1, wherein the rib projection opening portion is devoid of the guiding member.

3. The mold according to claim 1, wherein a width of the rib projection opening portion is larger than the diameter of the connecting member.

4. The mold according to claim 1, wherein an angle of the chamfered surface relative to a direction along which the rib projection opening portion extends, is greater than or equal to 20 degrees and less than or equal to 60 degrees.

* * * * *